(12) United States Patent
Iwamoto et al.

(10) Patent No.: US 6,519,946 B2
(45) Date of Patent: Feb. 18, 2003

(54) COGENERATION SYSTEM USING WASTE-HEAT GAS GENERATED IN MICRO GAS TURBINE

(75) Inventors: Takashi Iwamoto, Hokkaido (JP); Hiroyuki Togo, Hokkaido (JP); Masamitsu Murai, Hokkaido (JP); Ritsu Miura, Kanagawa (JP); Koji Hattori, Kanagawa (JP); Harunobu Takeda, Kanagawa (JP)

(73) Assignee: The Japan Steel Works, Ltd., Tokyo (JP)

( * ) Notice: Subject to any disclaimer, the term of this patent is extended or adjusted under 35 U.S.C. 154(b) by 0 days.

(21) Appl. No.: 09/874,311

(22) Filed: Jun. 6, 2001

(65) Prior Publication Data

US 2001/0049933 A1 Dec. 13, 2001

(30) Foreign Application Priority Data

Jun. 9, 2000 (JP) ........................................ 2000-174319

(51) Int. Cl.$^7$ ............................................... F02C 6/18
(52) U.S. Cl. ........................ 60/784; 60/39.5; 60/39.511; 62/238.3; 62/480
(58) Field of Search .............................. 60/39.5, 39.511, 60/39.182, 784; 62/238.3, 480

(56) References Cited

U.S. PATENT DOCUMENTS

| 3,668,884 A | * | 6/1972 | Nebgen ................... 60/39.511 |
| 3,943,719 A | * | 3/1976 | Terry et al. ................. 60/644.1 |
| 4,161,211 A | * | 7/1979 | Duffy et al. .................. 62/46.2 |
| 4,615,177 A | * | 10/1986 | Lane et al. ................. 62/238.3 |
| 4,942,734 A | * | 7/1990 | Markbreiter et al. ..... 60/39.182 |
| 5,085,271 A | * | 2/1992 | Yanadori et al. .............. 62/480 |
| 5,127,470 A | * | 7/1992 | Inaba et al. .................... 62/480 |
| 5,477,706 A | * | 12/1995 | Kirol et al. .................... 62/480 |
| 6,107,693 A | * | 8/2000 | Mongia et al. ............. 290/4 R |

* cited by examiner

Primary Examiner—Ted Kim
(74) Attorney, Agent, or Firm—Sughrue Mion, PLLC

(57) ABSTRACT

A waste-heat gas driven cogeneration having a micro gas turbine, driving portions including high-temperature-side hydrogen storage alloy containers respectively and operated by heat exchange between waste-heat gas generated from the turbine and a cooling heat medium, and cold-heat generating portions including low-temperature-side hydrogen storage alloy containers respectively to absorb and release hydrogen into/from the containers to generate cold heat and supply the cold heat.

6 Claims, 3 Drawing Sheets

COGENERATION SYSTEM USING WASTE-HEAT GAS GENERATED IN MICRO GAS TURBINE

CROSS REFERENCE TO RELATED APPLICATIONS

The present invention is based on Japanese Patent Application No. 2000-174319, which is incorporated herein by reference.

BACKGROUND OF THE INVENTION

1. Field of the Invention

The present invention relates to a waste-heat gas driven cogeneration system using waste-heat gas generated from a micro gas turbine so that a cold heat output can be obtained efficiently.

2. Description of the Related Art

Public attention has been paid to a micro gas turbine electric power plant as a distributed electric source recently. The plant uses natural gas or biogas as fuel and the fuel is burned to operate a small-sized gas turbine to thereby generate electric power. However, it cannot be said that energy efficiency in the plant is sufficiently high. Because a large amount of energy is lost as waste heat into exhaust gas, it may be said that the plant is adapted to a cogeneration system for recovering waste heat and using it efficiently. In the background art, a cogeneration system for obtaining hot water by use of waste heat has been proposed from this point of view.

In the background-art cogeneration system for obtaining hot water, however, total efficiency is low and it is hardly worth using the cogeneration system when there is no need for hot water.

On the other hand, electric power is in great demand particularly in the field of freezers and coolers in summer, so that public hopes are put on a cogeneration system capable of supplying cold heat also from the point of view of leveling electric power. From this point of view, there may be conceived a method in which steam is generated from waste-heat gas to thereby operate a freezer using lithium bromide. It is however impossible to obtain a coolant at a temperature not higher than 5° C. because water is used as a coolant theoretically in this method. It is therefore difficult to apply this method to refrigeration. On the other hand, it is conceived that this method is applied to an ammonia absorption type refrigerator in which a coolant in a freezing temperature range can be obtained by use of steam.

Ammonia to be used as a coolant in this refrigerator is however harmful to the human body. Leaking of ammonia to the outside may be caused by corrosion or the like, if a material to be used is selected by mistake. If leaking of ammonia to the outside occurs once, there is a problem in worries about damages such as very great damage to the human body, an offensive odor deposited on peripheral goods and particularly prohibition against foods. It cannot be said that this system is adapted for small-scale industry and private use expected as a distributed electric source. It is conceived that application of this system to private districts and the field of foods is difficult practically.

SUMMARY OF THE INVENTION

The present invention is designed upon such circumstances as the background and an object of the present invention is to provide a waste gas-driven cogeneration system in which thermal energy is obtained effectively from waste heat of exhaust gas generated from a micro gas turbine so that the thermal energy can be used as a driving source to generate cold heat for refrigeration or cooling.

That is, in order to solve the above object, according a first aspect of the present invention, there is provided a cogeneration system using micro gas turbine waste-heat gas, comprising: a micro gas turbine; a driving portion having a high-temperature-side hydrogen storage alloy container and for operating through direct or indirect heat exchange between the high-temperature-side hydrogen storage alloy container and waste-heat gas from the micro gas turbine and a cold-heat heat medium to thereby absorb and release hydrogen; and a cold heat output portion having a low-temperature-side hydrogen storage alloy container and for absorbing and releasing hydrogen by use of the low-temperature-side hydrogen storage alloy container in accordance with the operation of the driving portion to generate cold heat, transmit the cold heat to a cooling heat medium to thereby externally supply the cold heat through the cooling heat medium.

According to a second aspect of the present invention, in the cogeneration system using micro gas turbine waste-heat gas as defined in the first aspect, the heat exchange between the waste-heat gas from the micro gas turbine and the high-temperature-side container is performed indirectly through steam generated by heat of the waste-heat gas.

According to a third aspect of the present invention, in the cogeneration system using micro gas turbine waste-heat gas as defined in the first or second aspect, the driving portions and the cold heat generating portions are provided multistageously respectively so that waste-heat gas subjected to heat exchange in the pre-stage driving portion is further subjected to heat exchange in the post-stage driving portion to thereby make the post-stage driving portion operate.

According to a fourth aspect of the present invention, in the cogeneration system using micro gas turbine waste-heat gas as defined in the third aspect, heat exchange is performed between the waste-heat gas from the micro gas turbine and the pre-stage high-temperature-side container indirectly through steam generated by heat of the waste-heat gas whereas after the heat exchange, and further heat exchange is performed directly between the waste-heat gas after the first heat exchange and the post-stage high-temperature-side container.

According to a fifth aspect of the present invention, the cogeneration system using micro gas turbine waste-heat gas, as defined in any one of the first through fourth aspects, further comprises a hot water generator for generating hot water by performing heat exchange between water of the hot water generator and the waste-heat gas after the waste-heat gas is subjected to the heat exchange in the driving portion.

According to the present invention, waste heat generated from the micro gas turbine is used as a driving source. To use such waste heat, direct or indirect heat exchange is performed between exhaust gas with the waste heat, that is, waste-heat gas and a high-temperature-side hydrogen storage alloy container to thereby recover thermal energy.

Incidentally, for improvement of energy efficiency in the micro gas turbine, the temperature is raised by heat exchange between air taken in the turbine and the waste-heat gas to thereby improve power generating efficiency. As a result, the temperature of the waste-heat gas finally discharged from the micro gas turbine becomes low about 300° C. As described above, a cogeneration system for recovering heat from waste-heat gas and recycling the heat in order to improve energy efficiency in the micro gas turbine plant has been discussed. In the existing situation, nothing but hot water can be obtained because the temperature of waste-heat gas is low as described above. Hence, cold heat necessary for use in coolers and refrigerators particularly in summer cannot be obtained.

According to a first embodiment of the present invention, waste-heat gas by which the background-art heat-driving type cooler system cannot be driven is imported from the micro gas turbine and subjected to direct heat exchange with the hydrogen storage alloy container to thereby generate cold heat. Hence, a refrigeration output can be obtained in a freezing temperature range which can be adapted for small-scale industry and private use, food industry use, etc. This system can be used as a high-energy-efficiency system in a food factory, a convenience store, a supermarket, a hospital, a hotel, or the like. Moreover, this system can be provided as a cogeneration system using a micro gas turbine free from any problem in leaking an offensive odor, or the like.

According to a second embodiment of the present invention, waste-heat gas at a high temperature without heat exchange with intake air can be used to make it possible to attain improvement of energy-utilizing efficiency though power generating efficiency in the micro gas turbine is reduced. That is, heat exchange is performed between high-temperature waste-heat gas generated from the micro gas turbine and a heat medium so that the driving portions in the present invention can be operated by the heat medium with heat energy.

This is equivalent to the second aspect of the present invention. Steam is used as the heat medium so that indirect heat exchange is performed between the waste-heat gas and the high-temperature-side hydrogen storage alloy container. Also in this embodiment, the waste-heat gas can be used as a driving source to drive a refrigeration system using hydrogen storage alloy. Hence, a refrigeration output which can be adapted for small-scale industry and private use, food industry use, etc. can be obtained. Incidentally, in this system, waste-heat energy is transmitted to another heat medium. Hence, even in the case where the condition for generating waste gas varies in accordance with the start and stop of the heat micro gas turbine, there is an advantage in that the instability of the cold-heat output caused by the change of the condition can be eliminated if measures to store thermal energy and reserve it once are taken.

Further, the driving portions and the cold-heat generating portions may be provided multistageously so that waste-heat gas subjected to heat exchange in each of the front-side driving portions can be further subjected to heat exchange in each of the post-stage driving portions.

In this embodiment, thermal energy remaining in the waste-heat gas used in the pre-stage can be used. Hence, total efficiency is improved, so that a refrigeration output which can be taken out increases. Preferably, after waste-heat gas the temperature of which is high is subjected to indirect heat exchange with each of the alloy containers through a heat medium such as steam in each of the pre-stage driving portions, the low-temperature waste-heat gas discharged is further subjected to direct heat exchange in each of the post-stage driving portions.

Moreover, waste-heat gas subjected to heat exchange in the driving portions is used so that hot water is obtained by a hot water generator. Because hot water is obtained in addition to the cold-heat output, total efficiency is improved more greatly. This embodiment can be applied to any one of the first, second, third and fourth aspects of the present invention.

Incidentally, in any aspect of the present invention, high-temperature-side hydrogen storage alloy containers and low-temperature-side hydrogen storage alloy containers are provided. A hydrogen storage alloy adapted to the operation of each of the containers is contained in the container. That is, it is necessary on the high-temperature side that hydrogen is released by waste-heat gas and absorbed by a cooling heat medium where as it is necessary on the low-temperature side that desired cold heat is generated by release of hydrogen. Each of the hydrogen storage alloys to be used in the present invention is not limited to a specific kind if the alloy satisfies these requirements. That is, any suitable alloy can be selected.

These hydrogen storage alloys are contained in the alloy containers respectively so that hydrogen can be absorbed and released. Absorption and release of hydrogen can be achieved when an aeration material is disposed in the container or a ventilation passage is secured to thereby make it possible to move hydrogen. Each of the alloy containers is generally made of a material having a shape adapted to heat exchange and having good heat conducting characteristic so that heat exchange can be performed between waste-heat gas generated from the micro gas turbine and the cooling heat medium. The configuration of each of the alloy containers is considered in accordance with whether heat exchange with the waste-heat gas is performed directly or indirectly.

The driving portions include the high-temperature-side containers respectively among the aforementioned containers. In each of the high-temperature-side containers, the container makes heat exchange with the waste-heat gas and the cooling heat medium directly or indirectly. Therefore, each of the driving portions is configured so that waste-heat gas or a heat medium substituted for the waste-heat gas and a cooling heat medium are imported into the driving portion. These heat media touch the aforementioned containers to thereby perform heat exchange. The driving portions are operated by the heat exchange to thereby absorb and release hydrogen. The absorbed and released hydrogen moves as a driving force between a driving portion and a corresponding cold-heat generating portion which will be described below. Therefore, a driving portion and a corresponding cold-heat generating portion are generally connected to each other by a hydrogen-travelling passage.

On the other hand, the cold-heat generating portions include the low-temperature-side containers respectively among the aforementioned containers. When cold heat is generated in each of the low-temperature-side containers, the cold heat is transmitted to the cold-heat heat medium. The cold heat is delivered to an external heat-utilizing portion by this heat medium or by a heat medium after further heat exchange. Although a refrigerator for storing foods is taken as an example of the cold heat-utilizing portion, the present invention is not limited thereto and can be applied to any apparatus which needs cooling or refrigeration.

DETAILED DESCRIPTION OF THE PREFERRED EMBODIMENTS

First Embodiment

Figure 1:
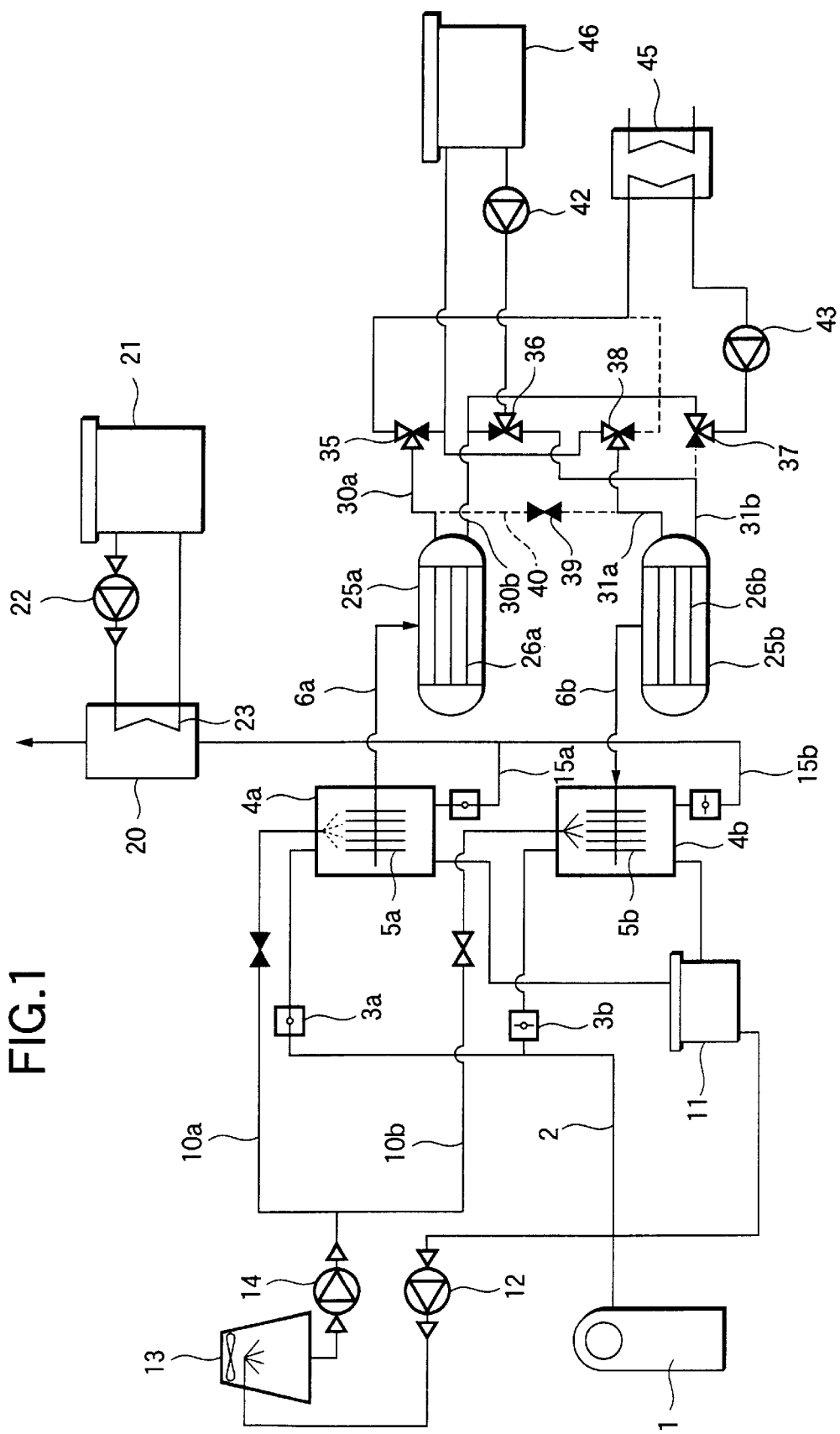
FIG. 1 is an overall system view showing the first embodiment of the present invention.

An embodiment of the system according to the present invention will be described below with reference to FIG. 1.

Incidentally, in the embodiments described below, a pair of driving portions and a pair of cold-heat generating portions are provided for generating cold heat continuously. This embodiment will be described below in detail.

A gas turbine electric power plant 1 has a gas turbine and an electric generator in its inside and further has an exhaust duct 2 for discharging exhaust gas generated in the gas turbine.

The exhaust duct 2 is connected to the pair of driving portions 4a and 4b through switching devices 3a and 3b respectively. Each of the driving portions 4a and 4b is shaped like a container. Hence, hydrogen storage alloy containers 5a and 5b containing high-temperature-side hydrogen storage alloy are disposed in the inside of the driving portions 4a and 4b respectively. Hydrogen-travelling passages 6a and 6b connected to the containers 5a and 5b respectively extend to the outside of the driving portions 4a and 4b respectively.

Further, cooling water pipes 10a and 10b are connected to the driving portions 4a and 4b respectively so that cooling water to be brought into contact with the alloy containers 5a and 5b is imported or discharged as a heat medium for cooling.

Respective return flow sides of the cooling water pipes 10a and 10b are connected to a cooling water recovery tank 11. The cooling water pipes 10a and 10b joined together by the cooling water recovery tank 11 are connected to an external cooling tower 13 through a cooling water pump 12. On the other hand, respective delivery flow sides of the cooling water pipes 10a and 10b are connected to the cooling tower 13 through a cooling water pump 14 while they are joined together.

Further, exhaust gas-moving pipes 15a and 15b are connected to the driving portions 4a and 4b respectively so that exhaust gas is moved so as to be discharged after heat exchange in the containers 5a and 5b. The exhaust gas-moving pipes 15a and 15b are joined together and then connected to an external hot water generator 20. The hot water generator 20 has a heat exchanger 23 for exchanging heat between water supplied by a tank 21 through a pump 22 and waste-heat gas supplied through the exhaust gas-moving pipes.

Further, a pair of cold-heat generating portions 25a and 25b are provided so as to correspond to the driving portions 4a and 4b respectively. Hydrogen storage alloy containers 26a and 26b containing low-temperature-side hydrogen storage alloy are disposed in the cold-heat generating portions 25a and 25b respectively. The aforementioned hydrogen-travelling passages 6a and 6b are connected to the containers 26a and 26b respectively.

Further, two pairs of heat medium pipes 30a and 30b; 31a and 31b are connected to the cold-heat generating portions 25a and 25b respectively so that a heat medium for cold heat or cooling is imported and discharged in order to bring the heat medium into contact with the containers 26a and 26b.

These heat medium pipes 30a and 30b; 31a and 31b extend to the outside so as to be connected to a valve control circuit not shown. In the valve control circuit, one port of a three-way valve 35 is connected to the heat medium pipe 30a, another port is connected to the return flow side of a heat exchanger 45 with respect to cooling water and the other port is connected to the return flow side of a cold-heat medium tank 46. The heat medium pipe 30b is connected to one port of a three-way valve 36 and to one port of a three-way valve 37. Another port of the three-way valve 36 is connected to the delivery flow side of the cold-heat heat medium tank 46 through a heat medium pump 42. The heat medium pipe 31b is connected to the other port of the three-way valve 36. The heat medium pipe 31b is also connected to another port of the three-way valve 37. The delivery flow side of the heat exchanger 45 with respect to cooling water is connected to the other port of the three-way valve 37 through a cooling liquid pump 43. Further, the heat medium pipe 31a is connected to one port of the three-way valve 38. The return flow side of the heat exchanger 45 with respect to cooling water is connected to another port of the three-way valve 38. The other port of the three-way valve 38 is connected to the return flow side of the cold-heat heat medium tank 46. The heat medium pipes 30a and 31a are connected to each other by a sensible heat recovery pipe 40 through a valve 39.

The operation of this system will be described below.

In the micro gas turbine electric power plant 1, fuel such as natural gas is imported and burned to operate the gas turbine. The electric generator is driven by the output of the gas turbine. Thus, electric power is generated. The electric power is supplied to suitable electric appliances, equipment, etc. In this occasion, heat exchange is made between waste-heat gas and supplied air. After the heat exchange, the temperature of the waste-heat gas generated in the gas turbine is about 300° C. The waste-heat gas is discharged to the outside through the exhaust duct 2. In this occasion, the switching devices 3a and 3b are operated so that the waste-heat gas is moved only to the driving portion 4a side. The operation in this occasion is based on the assumption that hydrogen has been already stored in the hydrogen storage alloy in each of the high-temperature-side container 5a and the low-temperature-side container 26b whereas hydrogen has been already released from the hydrogen storage alloy in each of the high-temperature-side container 5b and the low-temperature-side container 26a.

The waste-heat gas imported into the driving portion 4a touches the container 5a and is discharged from the exhaust gas-moving pipe 15a after heat exchange between the waste-heat gas and the container 5a.

The container 5a is heated by contact, that is, heat exchange with the waste-heat gas, so that the hydrogen storage alloy contained in the container 5a is heated through the container wall. Hydrogen stored in the heated hydrogen storage alloy is released from the heated hydrogen storage alloy moved to the low-temperature-side container 26a of the cold-heat generating portion 25a through the hydrogen-travelling passage 6a and stored in the hydrogen storage alloy contained in the container 26a. Incidentally, in this occasion, the heat medium pipes 30a and 30b are connected to the heat exchanger 45 with respect to cooling water by the operation of the three-way valves 35 to 38 to import the cooling liquid into the cold-heat generating portion 25a to thereby cool the hydrogen storage alloy contained in the container 26a to thereby promote storage of hydrogen in the alloy. This step is equivalent to the step of reclaiming the low-temperature-side hydrogen storage alloy and also equivalent to the step of preparation for generating cold heat in an after-step.

On the other hand, hydrogen has been already released from the hydrogen storage alloy on the driving portion 4b side in the aforementioned step as a pre-step. Hence, hydrogen is stored in the hydrogen storage alloy contained in the container 26b.

The driving portion 4b is in a state after the driving portion 4b is heated by waste-heat gas in the same manner as described above. Hence, the container 5b and the hydrogen storage alloy contained in the container 5b are in a high-temperature state. In this state, cooling water is delivered from the cooling tower 13 and imported into the driving portion 4b through the cooling water pipe 10b by the cooling water pump 14 to thereby cool the container 5b in parallel with the aforementioned step. The cooling water applied to the container 5b is recovered into the cooling water recovery tank 11 and returned to the cooling tower 13 through the cooling water pipe by the pump 12.

The equilibrium hydrogen pressure of the hydrogen storage alloy contained in the container 5b is reduced by the aforementioned cooling, so that suction force of hydrogen is generated. The suction force is transmitted to the low-temperature-side container 26b through the hydrogen-travelling pipe 6b. In the container 26b, hydrogen is released from the hydrogen storage alloy by the suction force, so that the hydrogen is stored in the hydrogen storage alloy contained in the high-temperature-side container 5b through the hydrogen-travelling pipe 6b. In the container 26b, cold heat is generated by the aforementioned release of hydrogen. In the cold-heat generating portion 25b, the heat medium pipes 31a and 31b are connected to the cold-heat heat medium tank 46 by the operation of the three-way valves 35 to 38 to transmit cold heat to the cold-heat heat medium circulating through the heat medium pipes 31a and 31b. The heat medium is supplied to a refrigeration output portion (not shown) of a refrigerator, or the like, to generate a refrigeration output because the heat medium flows back to the heat medium tank 46.

When the aforementioned operations are made alternately in the driving portions 4a and 4b and cold-heat generating portions 25a and 25b, a refrigeration output can be obtained continuously.

Incidentally, when the operations of the cold-heat generating portions 25a and 25b are to be switched over, the valve 39 is opened to connect the cold-heat generating portions 25a and 25b to each other through the sensible heat recovery pipe 40 to circulate the cold-heat heat medium between the cold-heat generating portions to thereby recover the sensible heat from the containers and hydrogen storage alloys.

On the other hand, the exhaust gas discharged from the driving portions 4a and 4b after heat exchange is delivered to the external hot water generator 20 through the exhaust gas-moving pipes 15a and 15b, so that heat is transmitted to the water supplied from the tank 21 to the heat exchanger 23 of the hot water generator 20. Hence, the water becomes hot. The hot water is returned to the tank 21 so that the hot water can be used suitably. On the other hand, the waste-heat gas after heat exchange is taken out from the hot water generator 20 so that the waste-heat gas can be discharged by a suitable method.

As described above, in the refrigeration system, a refrigeration output can be generated efficiently even in relatively-low-temperature waste-heat gas. When the refrigeration system is attached to a micro gas turbine electric power plant, an energy generating system very high in energy-utilizing efficiency can be obtained as a whole. In addition, as for the environmental aspect, a refrigeration output can be obtained without any disturbance of the environment. It can be said that this system is excellent in the environmental aspect when this system is combined with the micro gas turbine electric power plant gentle to the environment.

Second Embodiment

Figure 2:
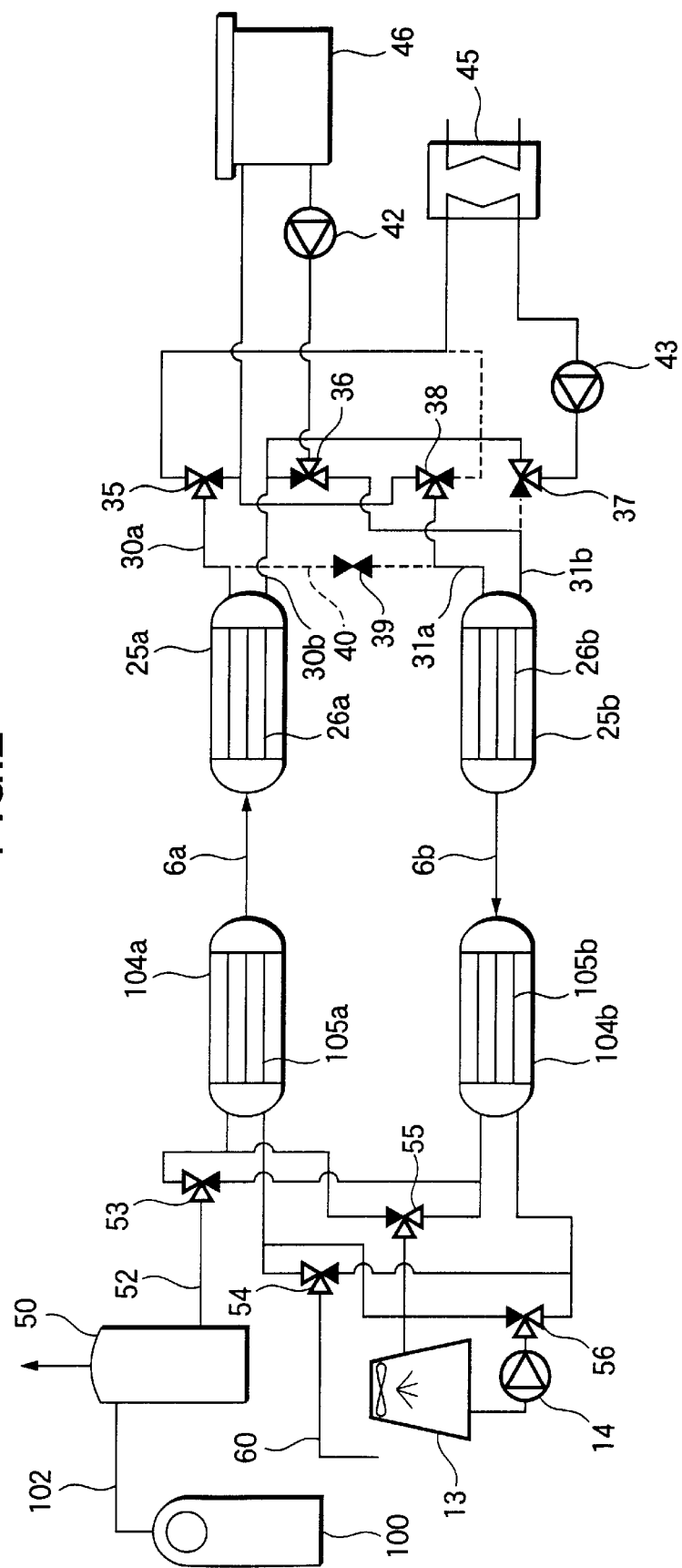
FIG. 2 is an overall system view showing the second embodiment of the present invention.

Another embodiment of the system according to the present invention will be described below with reference to FIG. 2.

Incidentally, in a micro gas turbine electric power plant 100 in this embodiment, the temperature of waste-heat gas discharged from the electric power plant 100 is relatively high because heat exchange is not made between the waste-heat gas and supplied air.

Incidentally, the configuration of this embodiment the same as the aforementioned first embodiment is referenced by identical numerals and the description of the same configuration will be omitted or made in brief.

An exhaust duct 102 is provided in the gas turbine electric power plant 100 so that exhaust gas discharged from the plant 100 is moved through the duct 102. The duct 102 is connected to a boiler 50. A heat exchanger is disposed in the boiler 50 so that heat exchange is made between waste-heat gas supplied through the exhaust duct 102 and water to thereby generate steam. One end of a steam pipe 52 for supplying the steam to the outside is connected to the boiler 50 and the other end of the steam pipe 52 is connected to one port of a three-way valve 53. Another port of the three-way valve 53 is connected to one heat medium input and output portion of a driving portion 104a. The other port of the three-way valve 53 is connected to one heat medium input and output portion of a driving portion 104b. The other heat medium input and output portion of the driving portion 104a is connected to one port of a three-way valve 54. Another port of the three-way valve 54 is connected to a steam abolition pipe 60. The other port of the three-way valve 54 is connected to the other heat medium input and output portion of the driving portion 104b. One heat medium input and output portion of the driving portion 104a is further connected to one port of a three-way valve 55. Another port of the three-way valve 55 is connected to the return flow side of a cooling tower 13. The other port of the three-way valve 55 is connected to one heat medium input and output portion of the driving portion 104b. The other heat medium input and output portion of the driving portion 104a is further connected to one port of a three-way valve 56. The delivery flow side of the cooling tower 13 is connected to another port of the three-way valve 56 through a pump 14. The other port of the three-way valve 56 is connected to the other heat medium input and output portion of the driving portion 104b.

The driving portions 104a and 104b have hydrogen storage alloy containers 105a and 105b respectively. The containers 105a and 105b are connected to hydrogen storage alloy containers 26a and 26b of cold-heat generating portions 25a and 25b through hydrogen-travelling passages 6a and 6b respectively in the same manner as in the first embodiment. The containers 26a and 26b are connected to a heat exchanger 45 with respect to cooling water and a cold-heat heat medium tank 46 through heat medium pipes 30a and 30b; 31a and 31b and a valve control circuit.

The operation of the system according to this embodiment will be described below.

Waste-heat gas discharged from the micro gas turbine electric power plant 100 is imported into the boiler 50 through the exhaust duct 102. In the boiler 50, heat exchange between the waste-heat gas and water is performed by the heat exchanger. After heat exchange, the waste-heat gas is discharged. After heat exchange by the heat exchanger, steam is generated from the water. The steam is imported into the driving portion 104a through the steam pipe 52 with the three-way valve 53. After the steam passes through the driving portion 104a, the steam is abolished from the steam abolition pipe 60 through the three-way valve 54. In the driving portion 104a, hydrogen is released from the hydrogen storage alloy contained in the container 105a by heat exchange between the steam and the container 105a. The hydrogen is moved to the cold-heat generating portion 25a through the hydrogen-travelling passage 6a in the same manner as in the first embodiment and subjected to the low-temperature-side reclaiming process. On the other hand, in the driving portion 104b, cooling water is imported from the cooling tower 13 through the pump 14 with the three-way valve 56 so that the container 105b and the hydrogen storage alloy contained in the container 105b are cooled. Then, the cooling water is discharged from the heat medium input and output portion of the container 105b and returned to the cooling tower 13 through the three-way valve 54. In the container 105a, suction force of hydrogen is generated by the aforementioned cooling. As a result, hydrogen is released from the low-temperature-side container 26b having hydrogen stored therein, so that the hydrogen is stored in the hydrogen storage alloy contained in the high-temperature-side container 105b. In the container 26b, cold heat is generated by the release of hydrogen. The cold heat is transmitted to the cold-heat heat medium and supplied to a cold heat-utilizing portion in the same manner as in the first embodiment.

The aforementioned operations are repeatedly switched alternately in the driving portions 104a and 104b and cold-heat generating portions 25a and 25b by switching the three-way valves 53 to 56 and the three-way valves 35 to 39. As a result, cold heat is taken out continuously.

Third Embodiment

Figure 3:
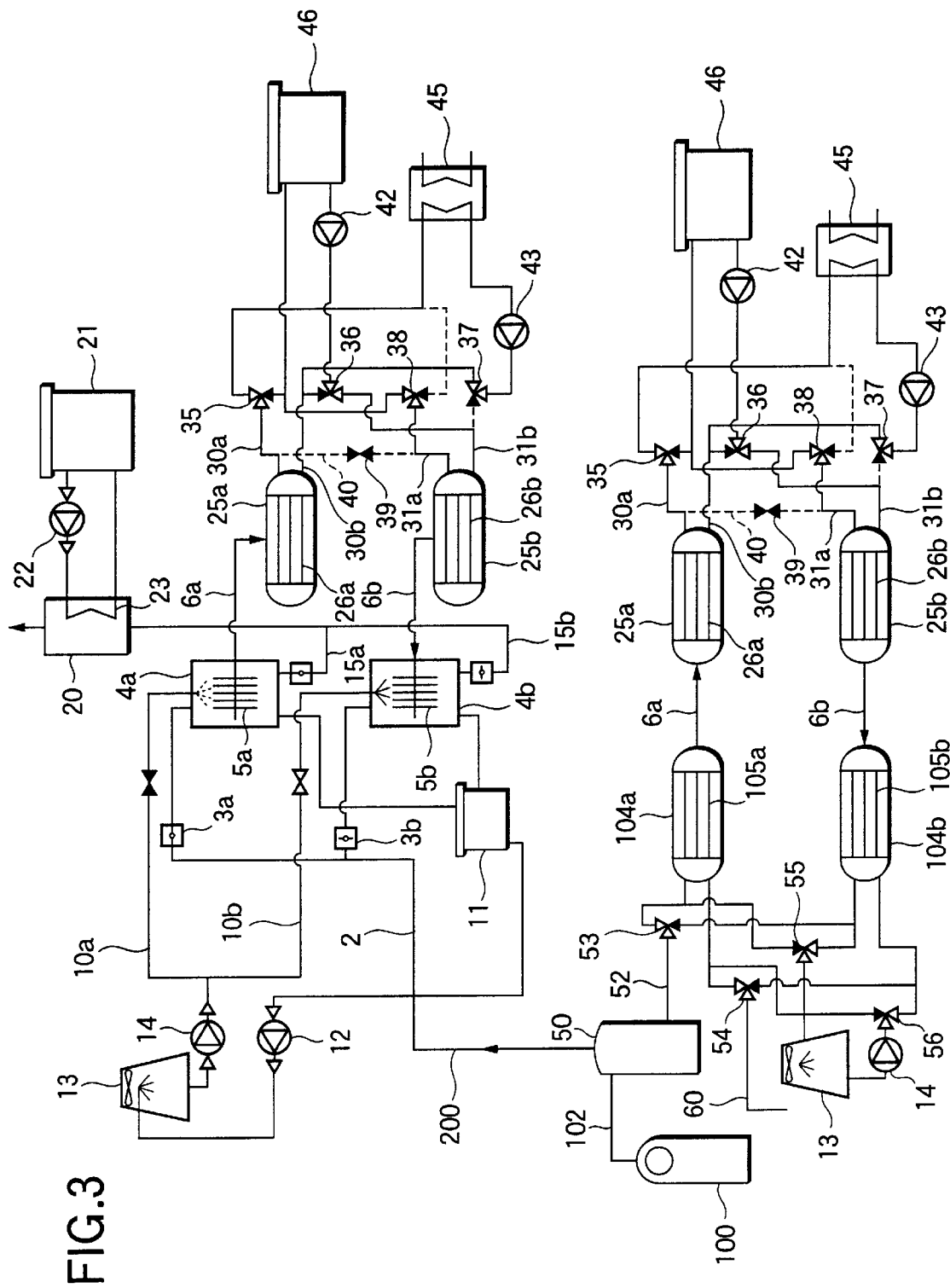
FIG. 3 is an overall system view showing the third embodiment of the present invention.

The third embodiment of the system according to the present invention will be described below with reference to FIG. 3.

In this embodiment, driving portions and cold-heat generating portions are provided multistageously (for example, in the form of two stages). In each stage, a pair of driving portions and a pair of cold-heat generating portions are provided in the same manner as in the aforementioned first and second embodiments. In this embodiment, the driving portions and the cold-heat generating portions in the pre-stage are configured in the same manner as in the second embodiment whereas the driving portions and the cold-heat generating portions in the post-stage are configured in the same manner as in the first embodiment. The third embodiment will be described below specifically. Incidentally, also the configuration of this embodiment the same as in the first and second embodiments is referenced by identical numerals and the description of the same configuration will be omitted or simplified.

In this embodiment, relatively-high-temperature waste-heat gas generated in the micro gas turbine electric power plant 100 is subjected to heat exchange by the boiler 50. Steam generated by the heat exchange heats the container 105a or 105b of the pre-stage driving portion 104a or 104b to operate the driving portion 104a or 104b. As a result, cold heat is generated in the pre-stage cold-heat generating portion 25a or 25b and supplied to a cold heat-utilizing portion.

Moreover, the waste-heat gas the temperature of which is reduced by the heat exchange in the boiler 50 is delivered to the post-stage driving portion 4a or 4b by a waste-heat gas supply pipe 200 and subjected to heat exchange in one driving portion. After the heat exchange in the post-stage driving portion, the waste-heat gas is further delivered to the hot water generator 20. In the hot water generator 20, the waste-heat gas is subjected to heat exchange to thereby generate hot water. Then, the waste-heat gas is abolished.

In this embodiment, cold heat can be obtained by the driving portions and cold-heat generating portions provided multistageously. Hence, cold heat can be obtained with high efficiency, so that total efficiency is improved greatly.

In addition, in this embodiment, steam is obtained from waste-heat gas in the pre-stage to thereby operate the pre-stage driving portions through indirect heat exchange in the pre-stage driving portions whereas the waste-heat gas after heat exchange in the pre-stage is subjected to heat exchange directly in the post-stage driving portions to thereby operate the driving portions. Hence, thermal energy of waste-heat gas can be recovered effectively and recycled.

As described above, the cogeneration system using micro gas turbine waste-heat gas according to the present invention comprises a micro gas turbine, driving portions including high-temperature-side hydrogen storage alloy containers respectively and operated by direct or indirect heat exchange between the micro gas turbine waste-heat gas and a cooling heat medium to absorb and release hydrogen into/from the containers, and cold-heat generating portions including low-temperature-side hydrogen storage alloy containers respectively to absorb and release hydrogen into/from the containers in accordance with the operation of the driving portions to generate cold heat, transmit the cold heat to a cold-heat heat medium and supply the cold-heat heat medium to the outside. Hence, cold heat can be obtained safely and efficiently by use of waste-heat gas generated in the micro gas turbine, so that a cogeneration system with good efficiency can be obtained.

Moreover, when the driving portions and cold heat generating portions are provided multistageously so that waste-heal gas subjected to heat exchange in the pre-stage driving portions is further subjected to heat exchange in the post-stage driving portions to thereby operate the post-stage driving portions, waste-heat gas can be used more efficiently. Hence, total efficiency is improved more greatly.

What is claimed is:

1. A cogeneration system using micro gas turbine waste-heat gas, comprising:

a micro gas turbine;

a driving portion comprising a high-temperature-side hydrogen storage alloy container and for absorbing hydrogen through heat exchange between said high-temperature-side hydrogen storage alloy container and a cold-heat heat medium, said driving portion being capable of releasing hydrogen through heat exchange between said high-temperature-side hydrogen storage alloy container and waste-heat gas from said micro gas turbine; and a cold heat output portion, connected to said driving portion so that hydrogen can move therebetween, comprising a low-temperature-side hydrogen storage alloy container and being capable of absorbing and releasing hydrogen by use of said low-temperature-side hydrogen storage alloy container in accordance with the operation of said driving portion to generate cold heat, and transmit said cold heat to a cooling heat medium to thereby externally supply said cold heat through said cooling heat medium, wherein said heat exchange between said high-temperature-side hydrogen storage alloy container and said waste-heat gas from said micro gas turbine is a direct heat exchange.

2. A cogeneration system using micro gas turbine waste-heat gas according to claim 1, wherein an additional heat exchange is performed between said waste-heat gas from said micro gas turbine and an additional high-temperature-side container indirectly through steam generated by heat of said waste-heat gas.

3. A cogeneration system using micro gas turbine waste-heat gas according to claim 1, wherein said driving portion and said cold heat generating portions are provided multi-stageously respectively so that waste-heat gas subjected to heat exchange in a pre-stage driving portion is further subjected to heat exchange in a post-stage driving portion.

4. A cogeneration system using micro gas turbine waste-heat gas according to claim 3, wherein a first heat exchange is performed between said waste-heat gas from said micro gas turbine and said pre-stage high-temperature-side container indirectly through steam generated by heat of said waste-heat gas, and further heat exchange is performed directly between said waste-heat gas, after said first heat exchange, and a high-temperature-side container in said post stage.

5. A cogeneration system using micro gas turbine waste-heat gas according to claim 1, further comprising a hot water generator for generating hot water by performing heat exchange between water of said hot water generator and said waste-heat gas after said waste-heat gas is subjected to the heat exchange in said driving portion.

6. A cogeneration system using micro gas turbine waste-heat gas according to claim 1, wherein said cooling heat medium is a liquid refrigerant.

* * * * *